(12) United States Patent  (10) Patent No.: US 8,543,286 B2
Sundaram et al.  (45) Date of Patent: Sep. 24, 2013

(54) VEHICLE HARDWARE INTEGRITY ANALYSIS SYSTEMS AND METHODS

(75) Inventors: Padma Sundaram, West Bloomfield, MI (US); Dong Da, Novi, MI (US)

(73) Assignee: GM Global Technology Operations LLC

( * ) Notice: Subject to any disclaimer, the term of this patent is extended or adjusted under 35 U.S.C. 154(b) by 209 days.

(21) Appl. No.: 13/228,864

(22) Filed: Sep. 9, 2011

(65) Prior Publication Data

US 2012/0330501 A1    Dec. 27, 2012

Related U.S. Application Data

(60) Provisional application No. 61/500,902, filed on Jun. 24, 2011.

(51) Int. Cl.
*G01M 17/00* (2006.01)

(52) U.S. Cl.
USPC ....... 701/31.9; 701/29.2; 701/33.6; 701/31.7; 340/438

(58) Field of Classification Search
USPC .................... 701/29.1, 29.2, 29.9, 31.1, 31.6, 701/31.7, 31.8, 31.9, 33.6, 33.9, 34.4; 717/124; 714/47.1; 340/438, 439
See application file for complete search history.

(56) References Cited

U.S. PATENT DOCUMENTS

| | | | |
|---|---|---|---|
| 6,499,117 B1 * | 12/2002 | Tanaka | 714/49 |
| 7,200,525 B1 * | 4/2007 | Williams et al. | 702/185 |
| 7,730,363 B2 * | 6/2010 | Takezawa et al. | 714/47.1 |
| 8,015,550 B2 * | 9/2011 | Berenbach et al. | 717/124 |
| 2003/0195675 A1 * | 10/2003 | Felke et al. | 701/29 |
| 2011/0093916 A1 | 4/2011 | Lang et al. | |

* cited by examiner

*Primary Examiner* — Gertrude Arthur Jeanglaude

(57) ABSTRACT

A method includes: receiving classification data for a hazard associated with a system of a vehicle, the classification data indicating a classification of the hazard under standard 26262 of the International Organization for Standardization (ISO); receiving fault tree data for a fault tree of the hazard; analyzing the fault tree data using a fault tree analysis (FTA) application; identifying a minimal cut-set for the hazard; retrieving standards data for the hazard based on the classification of the hazard, the standards data indicating a minimum value for minimal cut-sets under the 26262 standard; comparing a number of elements in the minimal cut-set with the minimum value; and indicating whether the minimal cut-set complies with the 26262 standard based on the comparison.

15 Claims, 6 Drawing Sheets

VEHICLE HARDWARE INTEGRITY ANALYSIS SYSTEMS AND METHODS

CROSS-REFERENCE TO RELATED APPLICATIONS

This application claims the benefit of U.S. Provisional Application No. 61/500,902, filed on Jun. 24, 2011. The disclosure of the above application is incorporated herein by reference in its entirety.

FIELD

The present disclosure relates to vehicle hardware integrity analysis systems and methods and more particularly to hardware integrity analysis systems and methods using fault tree analysis.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle includes a plurality of systems, such as a powertrain system, a brake system, a fuel system, etc. Each system includes a plurality of hardware components and safety mechanisms. A safety mechanism may be a physical safety mechanism or a piece of software executed by a processor to act as a safety mechanism. A safety mechanism for a hardware component may perform a remedial action to provide a level of safety if the hardware component fails.

Systems of electrical (hardware) components of the vehicle may be required to comply with one or more automotive hardware integrity requirements, such as standard 26262 of the International Organization for Standardization (ISO). For example only, a hazard that could occur when one or more elements of a system fail may be required to have a probability of occurrence that is less than a predetermined probability to comply with the ISO 26262 standard.

SUMMARY

A method includes: receiving classification data for a hazard associated with a system of a vehicle, the classification data indicating a classification of the hazard under standard 26262 of the International Organization for Standardization (ISO); receiving fault tree data for a fault tree of the hazard; analyzing the fault tree data using a fault tree analysis (FTA) application; identifying a minimal cut-set for the hazard; retrieving standards data for the hazard based on the classification of the hazard, the standards data indicating a minimum value for minimal cut-sets under the 26262 standard; comparing a number of elements in the minimal cut-set with the minimum value; and indicating whether the minimal cut-set complies with the 26262 standard based on the comparison.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
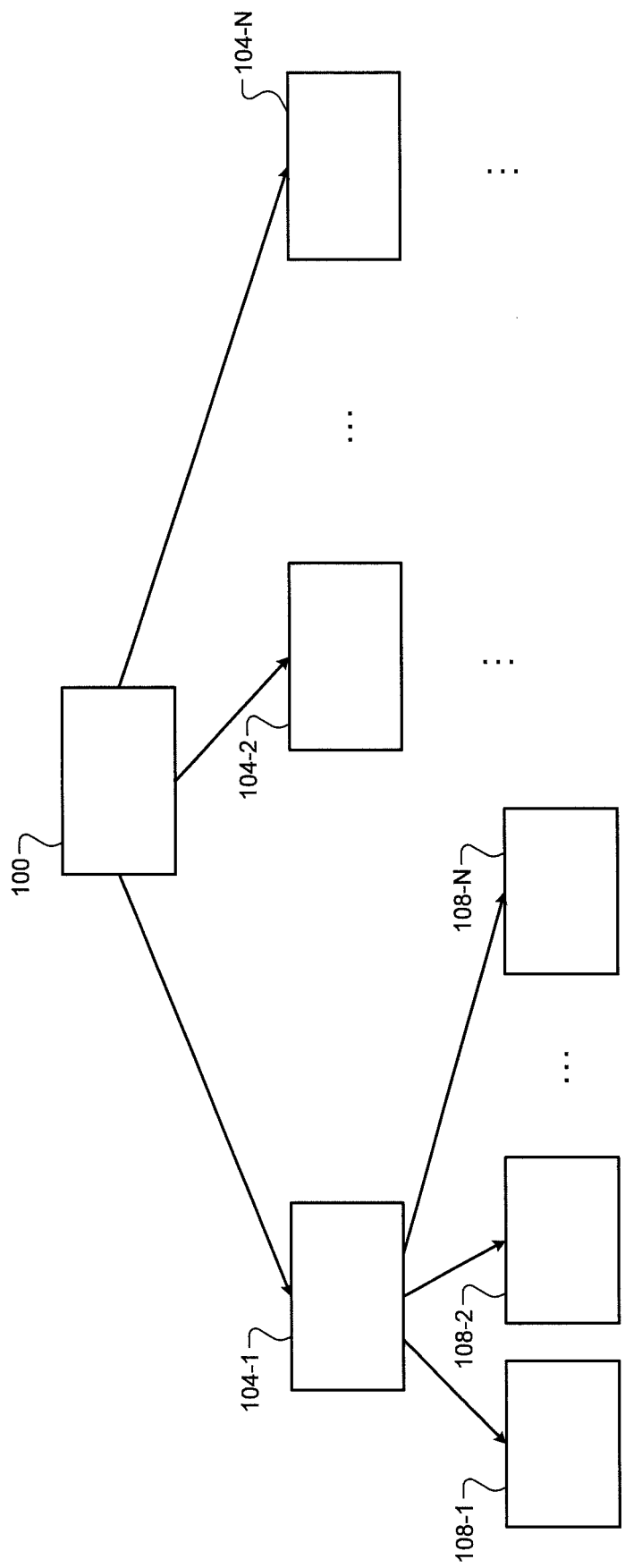
FIG. 1 is a functional block diagram of an example vehicle system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A vehicle manufacturer develops a preliminary report for a vehicle before the vehicle is made available for sale to the public. The preliminary report may indicate a hazard that could occur when one or more elements of a safety critical embedded control (SCEC) system of the vehicle fail. Whether a system is an SCEC system may be defined by an automotive hardware integrity standard, such as standard 26262 generated by the International Organization for Standardization (ISO). The preliminary report or one or more other preliminary reports may indicate each hazard that could occur for each SCEC system of the vehicle.

A fault tree may be created for the hazard and the SCEC system. A fault tree includes a tree of events linked by logic gates where each branch of the tree includes one or more lower level events that may cause the hazard to occur. A fault tree analysis (FTA) may be executed to determine whether the SCEC system complies with the ISO 26262 standard or the requirements of another suitable automotive hardware integrity standard.

The FTA may include a qualitative analysis and a quantitative analysis. The qualitative analysis may include a cut-set analysis and a diagnostic coverage analysis. The cut-set analysis includes determining each possible minimal cut-set for the fault tree. The cut-set analysis also includes determining whether the order of one or more of the minimal cut-sets is less than a predetermined minimum value for minimal cut-sets under the ISO 26262 standard for the hazard. If so, the FTA may indicate that the SCEC system does not comply with the ISO 26262 standard. If not, the FTA may indicate that the SCEC system complies with the ISO 26262 standard.

The diagnostic coverage analysis may include identifying each predetermined type of hardware fault in the minimal cut-sets. The diagnostic coverage analysis also includes determining whether one or more safety mechanisms are in place for each of the identified hardware faults and whether the safety mechanism(s) meet the requirements of the ISO 26262 standard for the hazard. If so, the FTA may indicate that the SCEC system complies with the ISO 26262 standard. If not, the FTA may indicate that the SCEC system does not comply with the ISO 26262 standard.

During creation of the fault tree, a failure rate may be included for each failure of an element of the SCEC system. The failure rates may be, for example, input by a user or retrieved from memory for the element. The quantitative analysis involves determining a probability of occurrence for the hazard. The probability of occurrence of the hazard may be determined based on probabilities of occurrence determined for the minimal cut-sets. The probability of occurrence for a minimal cut-set may be determined based on the failure rate of the elements of the minimal cut-set. The quantitative analysis also involves determining whether the probability of occurrence for the hazard is less than a predetermined probability for the hazard under the ISO 26262 standard. If so, the FTA may indicate that the SCEC system complies with the ISO 26262 standard. If not, the FTA may indicate that the SCEC system does not comply with the ISO 26262 standard.

Referring now to FIG. 1, an example tree diagram for a vehicle 100 is presented. The vehicle 100 includes a plurality of safety critical embedded control (SCEC) systems, such as systems 104-1, 104-2, . . . 104-N. An SCEC system can include an on vehicle embedded control system that can cause a top-level event (hazard) to occur if the SCEC system functions differently than intended. Examples of SCEC systems include, but are not limited to, electric power steering and steering lock systems, electronic controlled brake systems, electronic controlled propulsion systems, high voltage battery and charging systems, electric parking systems, electronic controlled suspension, chassis, and driveline systems, and active and passive safety systems. Electronic controlled propulsion systems include, for example, electronic controlled engine systems, electronic controlled transmission systems, electronic controlled hybrid systems, electronic controlled motor systems, and electronic controlled fuel cell based propulsion systems.

An SCEC system may be defined as a collection of elements which, working together, produce a result that is not achievable by the elements individually. Each SCEC system includes a plurality of elements. For example only, the system 104-1 includes elements 108-1, 108-2, . . . 108-N. Two or more elements may be considered a sub-system of an SCEC system.

An element may be, for example, an electrical component, a safety mechanism, a safety mechanism monitoring module, or another suitable type of SCEC system element. For example only, an electrical component may be one of the following N types of electrical components of SCEC systems:
(i) a harness (including splices and connectors);
(ii) a relay;
(iii) an actuator;
(iv) a sensor/switch;
(v) a processor central processing unit (CPU), arithmetic logic unit (ALU), program sequence, or clock;
(vi) an analog to digital (ND) converter or digital input/output (I/O);
(vii) a power supply;
(viii) memory; or
(ix) a serial communication.

A safety mechanism may be defined as a hardware or a software element that detects a fault in another element and acts when the fault is detected to achieve or maintain a safe state. A safety mechanism monitoring module may be defined as a software component that detects a fault in a safety mechanism and acts when the fault is detected to achieve or maintain a safe state.

Figure 2:
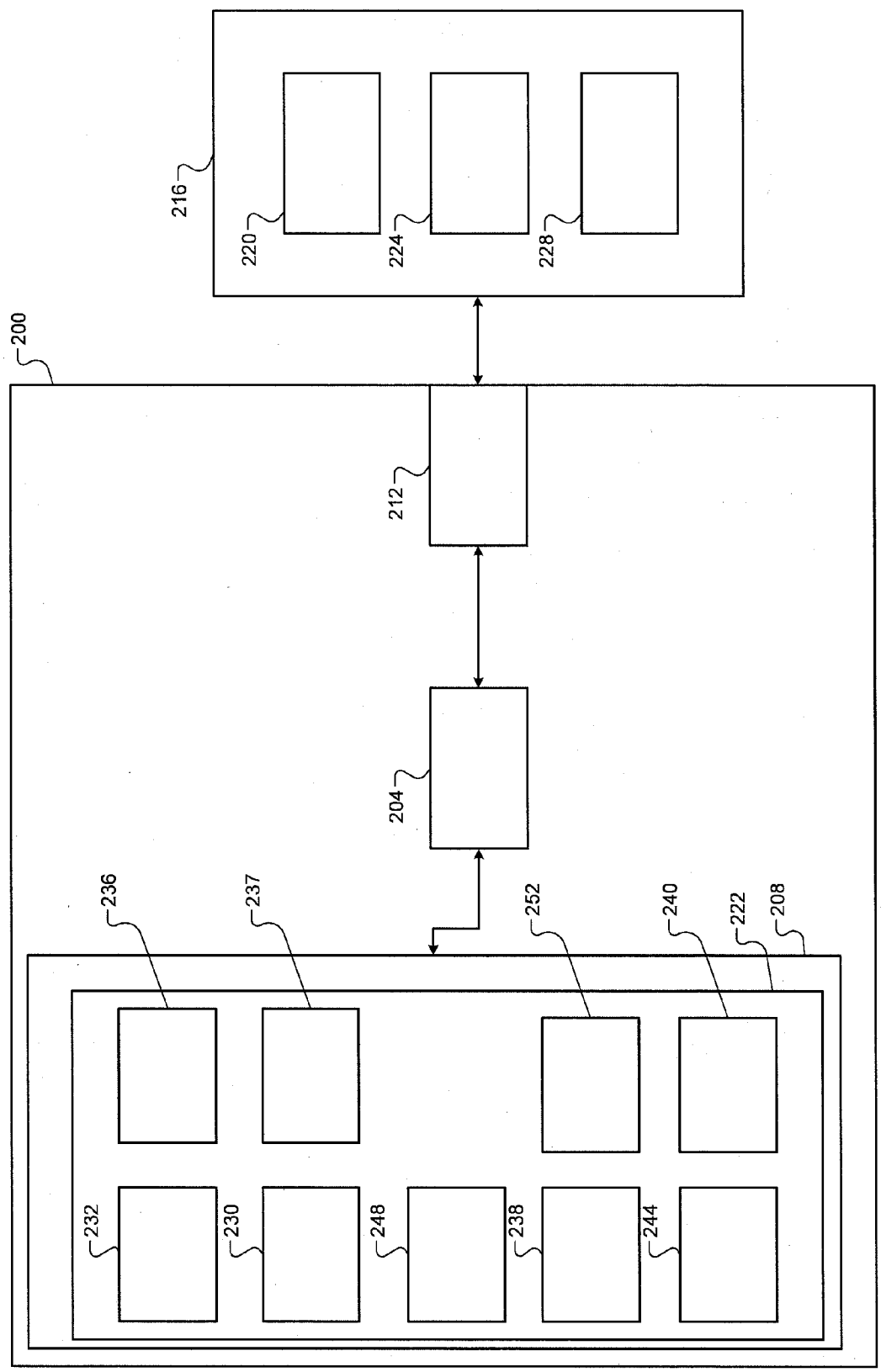
FIG. 2 is a functional block diagram of an example fault tree creation and analysis system according to the present disclosure.

Referring now to FIG. 2, a functional block diagram of an example fault tree creation and fault tree analysis (FTA) system is presented. A computer 200 includes a processor module 204, memory 208, and an input/output (I/O) interface 212. The processor module 204 performs functions based on input provided by a user via one or more I/O devices 216. The I/O devices 216 may include a keyboard 220, a mouse 224, a display 228, and/or one or more other suitable I/O devices. In various implementations, the mouse 224 may include another suitable type of pointing device. The display 228 may be a touchscreen display or another suitable type of display.

The processor module 204 selectively executes a fault tree analysis (FTA) application when prompted to execute the FTA application via user input. The FTA application may be stored in an FTA module 222 in the memory 208. For example only, the FTA application may include Fault Tree Plus (FT+) by Isograph or another suitable FTA application.

The FTA application enables a user to create, view, and analyze a fault tree for a hazard and an SCEC system. The FTA application also demonstrates whether the SCEC system is in compliance with the ISO 26262 standard for the hazard. The ISO 26262 standard includes minimum requirements for an SCEC system to comply with the ISO 26262 standard for a hazard. While the present disclosure will be discussed in terms of the ISO 26262 standard, the present disclosure is applicable to other automotive hardware integrity standards, such as a Quality System (QS) standard and other suitable standards.

Figure 3:
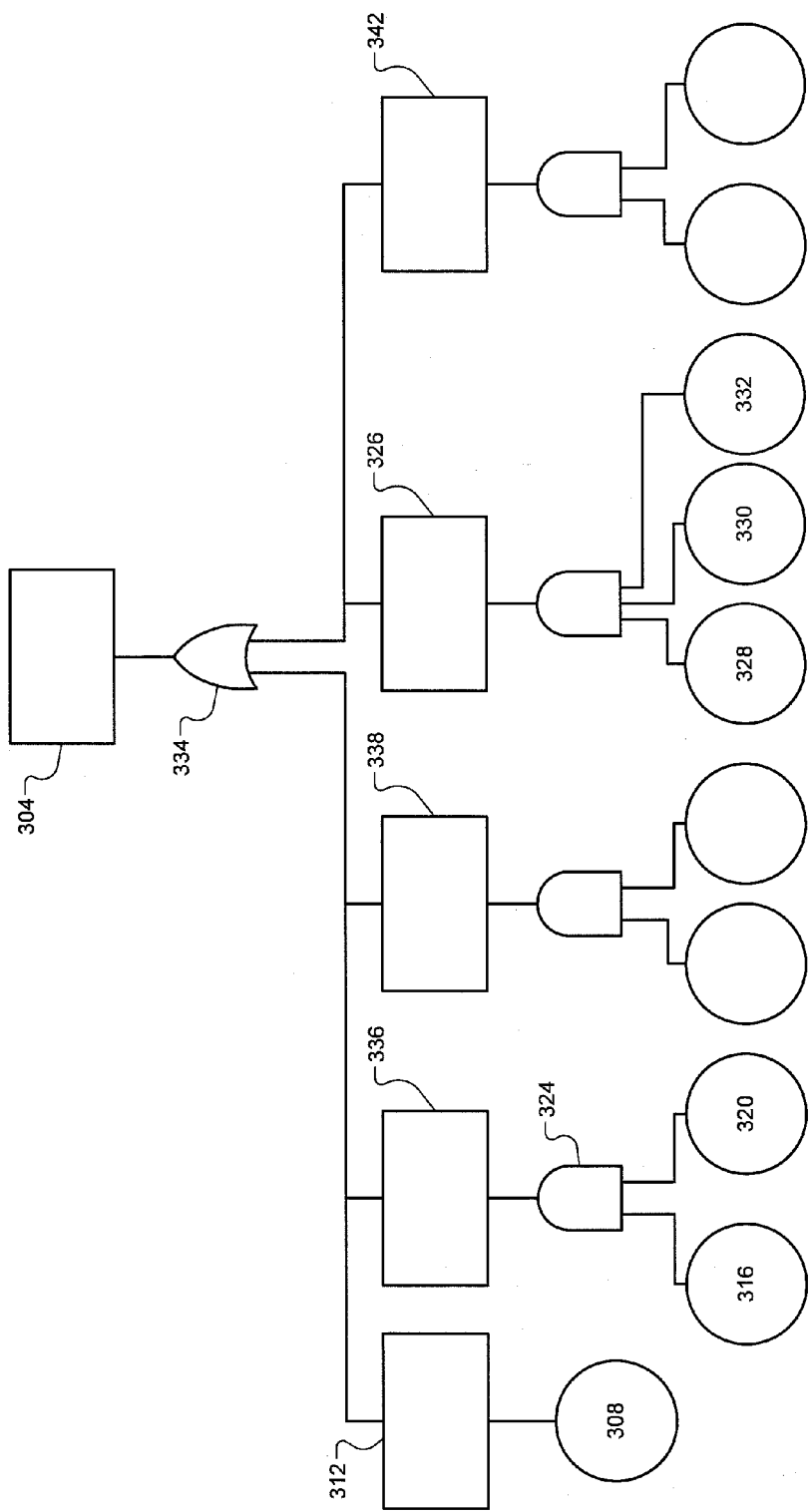
FIG. 3 is a diagram of an example fault tree generated using a fault tree analysis (FTA) application according to the present disclosure.

FIG. 3 includes a diagram of an example fault tree generated using the FTA application. Referring now to FIGS. 2 and 3, a fault tree creator module 230 may enable the user to create the fault tree for a hazard 304 and an SCEC system using fault tree blocks. For example only, the fault tree blocks may include basic element blocks and gate blocks.

Basic element blocks may be used, for example, for fault events in an electrical component and for fault events in safety mechanisms or safety mechanism monitoring modules. Gate blocks may include, for example, logic AND gate blocks, logic OR gate blocks, and fault tree blocks for other suitable logic gates. The user may manually add a fault tree block to the fault tree and input data for a fault for which the fault tree block was added to create the fault tree.

The user may create the fault tree based on a preliminary report for the vehicle 100. The preliminary report may be generated, for example, by a vehicle manufacturer during vehicle development/design. The preliminary report may include a list of sets of one or more faults in elements that could cause the hazard 304.

A hazard may be defined as a system state, event, or condition(s) that could cause harm. For example only, hazards may include unintended acceleration, unintended deceleration, unintended access to one or more rotating components, unintended change in driving direction, and unintended loss of deceleration due to incorrect communication of regenerative braking achieved by the propulsion system.

The user may provide a classification for the hazard 304 under the ISO 26262 standard. Minimum requirements used in determining whether the SCEC system complies with the ISO 26262 standard for the hazard 304 are determined based on the classification of the hazard 304 as discussed further below. For example only, the user may classify the hazard 304 under an automotive safety integrity level (ASIL) A, ASIL B, ASIL C, and ASIL D under the ISO 26262 standard. As the magnitude of harm that could occur increases, the ASIL classification letter (e.g., A, B, C, and D) may increase and vice versa.

The hazard 304 may occur when one or more elements of the SCEC system fail individually or in combination. For example only, the hazard 304 may occur when element 308 fails. Because the hazard 304 may occur when the element 308 fails by itself, the fault of the element 308 may be referred to as a single point fault as indicated at 312.

The hazard 304 may additionally or alternatively occur when elements 316 and 320 both fail at a given time. The fault tree can be created with an AND gate 324 to illustrate that the hazard 304 will only occur when both the elements 316 and 320 fail and will not occur when only one of the elements 316 and 320 fails. Faults that occur only when two elements fail may be referred to as dual point faults or multi point faults. Faults that occur only when more than two elements fail may be referred to as multi point faults. For example only, a multi point fault 326 may occur when elements 328, 330, and 332 fail. The fault tree can be created with an OR gate 334 to illustrate that the hazard 304 may occur when at least one of the single point fault 312 and the multi point faults 326, 336, 338, and 342 occur.

Each fault can be classified as one of a plurality of different types of faults. For example only, a single point fault may refer to a fault that has the potential to directly cause a hazard in the absence of a safety mechanism. A dual point fault may refer to a fault that, in combination with another independent fault, may cause a hazard to occur if unmitigated or undetected. A multi point fault may refer to a fault that in combination with another independent fault may cause a hazard if undetected or unmitigated. A latent fault may refer to an undetected or unmitigated fault in a system which, by itself, cannot cause a hazard but, in combination with one or more other faults, can cause a hazard.

A plausible dual point fault may refer to a dual point fault where one of two faults is a latent fault. A non-plausible multi point fault may refer to a fault of three or more elements or a non-plausible dual point fault. A cascading fault may refer to the fault of an element in a system causing other elements of the same system to fail. A common cause fault may refer to the fault of two or more elements in a system that result from a single specific event or root cause. A dependent fault is a fault whose probability of simultaneous or successive occurrence of two faults cannot be expressed as the simple product of the unconditional probabilities of the two faults occurring independently. A safe fault may refer to a fault whose occurrence will not cause a hazard. Single point faults, latent faults, dual point faults, plausible dual and multi point faults are not safe faults.

The user may specify a type for each hardware fault that the user adds to the fault tree. A hardware fault refers to a fault in an electrical component as opposed to a non-hardware fault in a safety mechanism or a safety mechanism monitoring module.

Figure 4:
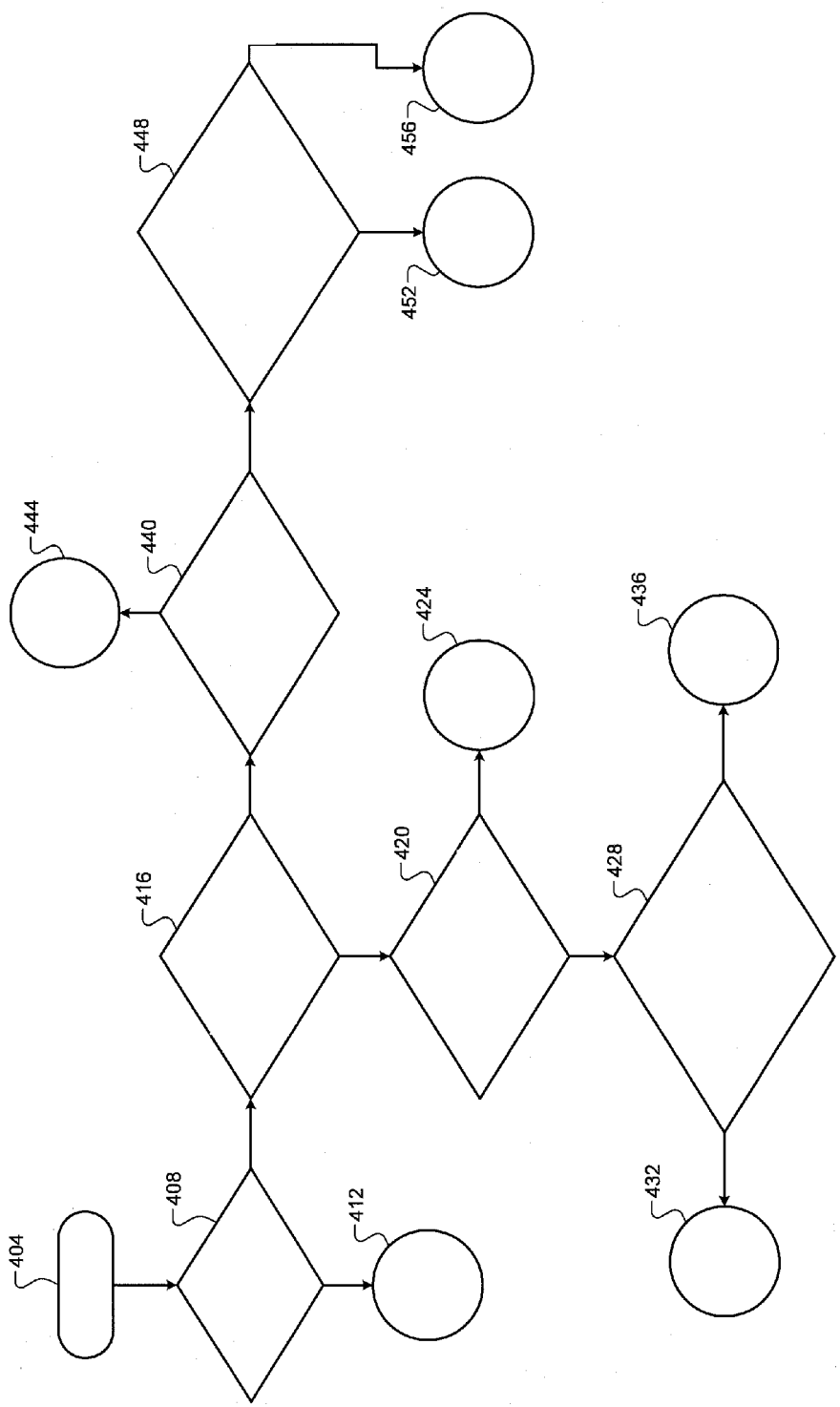
FIG. 4 is a flowchart depicting an example method of identifying a type of a hardware fault according to the present disclosure.

A fault classification module 232 may identify a type for a hardware fault. In various implementations, the user may identify a type for a hardware fault according to a predetermined method of identifying a type for a hardware fault. FIG. 4 includes a flowchart depicting an example method of identifying a type of a hardware fault that may be performed by the fault classification module 232. The fault classification module 232 may display questions for the user according to the method and identify the type of the hardware fault based on the user's responses.

Referring now to FIGS. 2 and 4, a user may wish to add a hardware fault 404 to the fault tree for the hazard 304. The fault classification module 232 may prompt the user to answer whether the element that has the hardware fault 404 is in an electrical (hardware) component of the SCEC system for which the fault tree is being generated at 408. If the user inputs a no response, the fault classification module 232 may identify the hardware fault 404 as a safe fault at 412. If the user inputs a yes response, the fault classification module 232 may continue at 416.

At 416, the fault classification module 232 may prompt the user to answer whether the hardware fault 404 has potential to cause the hazard 304 in the absence of one or more safety mechanisms. If the user inputs a yes response, the fault classification module 232 may continue at 420. If the user inputs a no response, the fault classification module 232 may continue at 440, which is discussed further below.

At 420, the fault classification module 232 may prompt the user to answer whether there is a safety mechanism in place that is capable of detecting and remediating the hardware fault 404. If the user inputs a no response, the fault classification module 232 may identify the hardware fault 404 as a single point fault at 424. If the user inputs a yes response, the fault classification module 232 may continue at 428. If the user inputs a yes response, the fault classification module 232 may also prompt the user to input the data for the safety mechanism so the safety mechanism can also be added to the fault tree.

The fault classification module 232 may prompt the user to answer whether there is a latent fault detection mechanism (safety mechanism monitoring module) in place that operates effectively to detect and remediate a fault with the safety mechanism at 428. If the user inputs a no answer, the fault classification module 232 may identify the hardware fault 404 as a plausible dual point fault at 432. The hardware fault 404 may be considered a plausible dual point fault at 432 because the safety mechanism's failure to operate effectively remains as a latent fault. The latent fault detection mechanism may operate effectively if it provides at least a predetermined level of diagnostic detection and remediation within a predetermined fault response time. If the user inputs a yes answer, the fault classification module 232 may identify the hardware fault 404 as a non-plausible multi point fault at 436.

Referring back to 440 (when the user inputs a no answer in response at 416), the fault classification module 232 may prompt the user to answer whether the hardware fault 404 has the potential to cause the hazard 304 if another independent fault occurs. If the user answers no, the fault classification module 232 may identify the hardware fault 404 as a safe fault at 444. If the user answers yes, the fault classification module 232 may continue at 448.

At 448, the fault classification module 232 may prompt the user to answer whether a latent fault detection mechanism is in place that operates effectively to detect and remediate the hardware fault 404. If the user answers no, the fault classification module 232 may identify the hardware fault 404 as a plausible dual point fault at 452. If the user answers yes, the fault classification module 232 may identify the hardware fault 404 as a non-plausible multi point fault at 456.

Referring back to FIG. 2, for each basic element block of the fault tree, a failure rate is input. For example only, a failure rate module 236 may provide one or more failure rates from stored failure rate data. The failure rate module 236 may select the failure rate for a basic element block based on the element associated with the basic element block and the type of fault. The stored failure rate data may include accepted failure rate values for each possible type of electrical component, such as failure rates under International Electrotechnical Commission (IEC) Technical Report (TR) 62380, IEC TR 61709, Military (MIL) handbook (HDBK) 217F notice 2, Reliability Analysis Center (RAC) HDBK 217 Plus MIL HDBK 338, IEC TR 62061:2005, or another suitable source. In various implementations, failure rates from multiple sources can be stored, and the failure rate module 236 may provide the failure rates from a source selected by the user. An example table of failure rates that may be used for different types of electrical components is provided below.

| Hardware Component | Component Detail | Failure Rate Per Operational Hour |
|---|---|---|
| Microprocessor | CPU Only | $10^{-7}$ |
| Micro Controller | Ram, Rom, ALU, I/O | $10^{-6}$ |
| Wiring | Open | $10^{-4}$ |
| | Short to Ground | $10^{-4}$ |
| | Short to Power | $10^{-6}$ |
| Sensors/ | Electrical/Electronic | $10^{-5}$ |
| Actuators | Mechanical | $10^{-4}$ |
| Communication Bus | Physical Layer | $10^{-5}$ |
| Automotive Electronic Control Unit (ECU) | Complete Circuit Board Assembly with Connectors | $10^{-5}$ |
| Individual Electrical Components | SMD Resistors (Internal to ECU) | $10^{-8}$ |
| | SMD Capacitors (Internal to ECU) | $10^{-5}$ |
| | Integrated Circuits (ICs) | $10^{-7}$ |

For another example only, the user can input the failure rate for one or more of the basic element blocks. The failure rate module 236 may generate an indicator when the failure rate of one or more of the basic element blocks are input by the user. The failure rate module 236 may identify the failure rates that were input by the user.

The FTA application selectively analyzes the fault tree for the hazard. More specifically, the FTA application may execute the analysis of the fault tree in response to user input. The analysis involves both a qualitative analysis and a quantitative analysis. A report generator module 237 generates an FTA report based on the analysis. Among other things, the FTA report indicates whether the SCEC system meets the ISO 26262 standards for the hazard.

The qualitative analysis involves two parts: a cut-set analysis and a diagnostic coverage analysis. A cut-set analysis module 238 performs the cut-set analysis. The cut-set analysis module 238 determines each possible minimal cut-set for the fault tree. The cut-set analysis module 238 creates a list of the possible minimal cut-sets in the FTA report.

Figure 5:
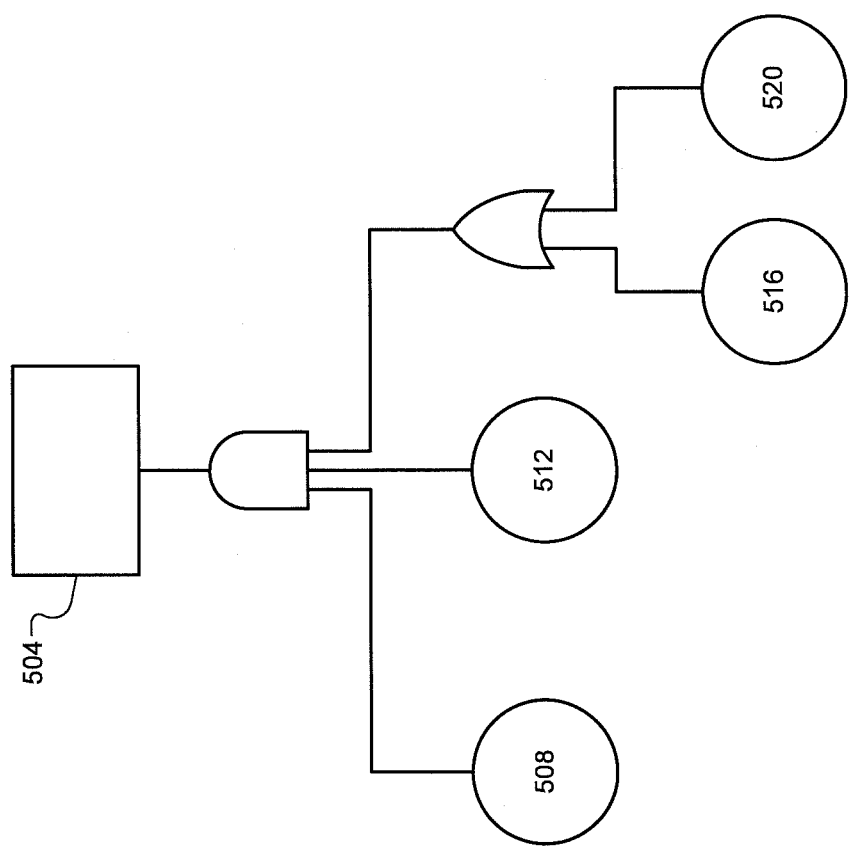
FIG. 5 is a diagram of another example fault tree according to the present disclosure.

FIG. 5 includes another example fault tree for a hazard 504. Referring now to FIG. 5, a cut-set may refer to a set of lower level events (e.g., element failures) in a fault tree that, if the lower level events occur at a given time, can lead to the top level event (e.g., hazard). For example only, the hazard 504 may occur if lower level events 508, 512, and 516 occur, or if lower level events 508, 512, and 520 occur, or if lower level events 508, 512, 516, and 520 occur. Thus, 508, 512, and 516 are a first cut-set, 508, 512, and 520 are a second cut-set, and 508, 512, 516, and 520 are a third cut-set.

A minimal cut-set is a cut-set with a minimal number of lower level events. For example, as noted above, the first cut-set includes 508, 512, and 516, and the third cut-set includes 508, 512, 516, and 520. The third cut-set includes four elements (508, 512, 516, and 520), and the first and second cut-sets each include only three elements (508, 512, and 516 and 508, 512, and 520, respectively). The third cut-set is not a minimal cut-set because it does not include the minimal number of lower level events. The first and second cut-sets, however, are minimal cut-sets.

Referring back to FIG. 2, the cut-set analysis module 238 determines each possible minimal cut-set and creates a list of the possible minimal cut-sets in the FTA report. The cut-set analysis module 238 determines the order of each of the minimal cut-sets (i.e., the number of elements in each minimal cut-set) and updates the FTA report to include the order of each of the minimal cut-sets.

The cut-set analysis module 238 determines a minimum order for the hazard 304 to comply with the ISO 26262 standard based on the classification of the hazard 304. A standards module 240 may provide the minimum order based on the classification of the hazard 304. The standards module 240 may obtain the minimum order from a table of minimum orders indexed by classification. An example table of the minimum order for different classifications of hazards is provided below.

| Classification under ISO 26262 | Minimum order cut-set requirement |
|---|---|
| ASIL D | 3 |
| ASIL C | 3 |
| ASIL B | 2 |
| ASIL A | 1 |

The cut-set analysis module 238 may compare the order of a minimal cut-set with the minimum order for the hazard 304 and indicate whether the minimal cut-set complies with the ISO 26262 standard based on the comparison. More specifically, the cut-set analysis module 238 may indicate that the minimal cut-set complies with the ISO 26262 standard when the order of the minimal cut-set is greater than or equal to the minimum order. The cut-set analysis module 238 may perform the comparison and include the indication in the FTA report for each minimal cut-set.

The diagnostic coverage analysis involves determining whether the SCEC system includes safety mechanisms and/or safety mechanism monitoring modules that are sufficient to protect against both single point faults and latent point faults. A coverage analysis module 244 may perform the diagnostic coverage analysis.

The coverage analysis module 244 may determine each single point fault and plausible dual point fault or latent fault that is in the minimal cut-sets. The coverage analysis module 244 may update the FTA report to include a list of each single point fault and plausible dual point fault/latent fault in the minimal cut-sets.

The coverage analysis module 244 may determine coverage analysis requirements for protecting against single point faults and plausible dual point faults/latent faults based on the classification of the hazard 304 under the ISO 26262 standard. The standards module 240 may provide the coverage analysis requirements based on the classification of the hazard 304. The standards module 240 may obtain the coverage analysis requirements from a table of coverage analysis requirements indexed by classification. An example table of the coverage analysis requirements for different classifications of hazards for single point faults and for plausible dual point faults/latent faults is provided below.

| Classification | Single Point Fault Requirement | Plausible Dual Point Fault/Latent Fault Requirement | Dependent Failure Evaluation |
|---|---|---|---|
| ASIL D | High Coverage | High Coverage | Required |
| ASIL C | High Coverage | Medium Coverage | Required |
| ASIL B | Medium Coverage | Low Coverage | Required |
| ASIL A | Low Coverage | Not Required | Required |

For a given single point fault or plausible dual point fault/latent fault, the coverage analysis module 244 may determine whether one or more safety mechanisms and safety mechanism monitoring modules are in place to satisfy the coverage analysis requirements. The coverage analysis module 244 may perform the determination for each single point fault and for each plausible dual point fault/latent fault. The coverage analysis module 244 may update the FTA report to indicate whether the coverage analysis requirements are met for each single point fault and for each plausible dual point fault/latent fault. The user may input (e.g., select) which types of coverage are provided for each safety mechanism and safety mechanism monitoring module in the fault tree. The coverage analysis module 244 may determine whether the coverage analysis requirements are met based on a comparison of the types of coverage input by the user and requirements for claiming satisfaction of a coverage analysis requirement. An example table illustrating coverage that one or more safety mechanisms and safety mechanism monitoring modules must provide to meet a coverage analysis requirement is provided below.

| Electrical Component | Required coverage for these typical failure modes to claim "Low" diagnostic coverage: | Required coverage for these typical failure modes to claim "Medium" diagnostic coverage: | Required coverage for these typical failure modes to claim "High" diagnostic coverage: |
|---|---|---|---|
| Harnesses including Splice and Connectors | Open circuit; Short circuit (to ground); | Open circuit; Short circuit (to ground, to power, neighboring pins); | Open circuit; Short circuit (to ground, to power, neighboring pins); Resistive drift between neighboring pins; |
| Relays | Failure to energize/de-energize; Welded contacts; | Failure to energize/de-energize; individual contacts welded; | Failure to energize/de-energize; individual contacts welded; |
| Actuator (detailed analysis may be necessary for technology specific failure modes*) | Open circuit; Short circuit (to ground); Out-of-range; Stuck (electrically, physically) | Open circuit; Short circuit (to ground, to power); Out-of-range; Frozen (physically or electrically stuck, locked); | Open circuit; Short circuit (to ground, to power, neighboring pins); Out-of-range; Frozen (physically or electrically stuck, locked); Drift or oscillations or Offset in the valid range; |
| Sensor/Switch (detailed analysis may be necessary for technology specific failure modes*) | Open circuit; Short circuit (to ground); Out-of-range; Stuck in the valid range; | Open circuit; Short circuit (to ground, to power, neighboring pins); Out-of-range; Offset in the valid range; Stuck in the valid range; | Open circuit; Short circuit (to ground, to power, neighboring pins); Out-of-range; Drift or oscillations or Offset in the valid range; Stuck in the valid range; Resistive drift between pins; |
| Processor CPU, | Stuck CPU, Addressing | CPU Addressing | Independent test of the |

-continued

| | | | |
|---|---|---|---|
| ALU, Program Sequence, Clock | modes (self test); Stuck ALU (self test); Stuck Registers (GPIO, internal RAM); Stuck Clock; Program flow/sequence stuck; Stuck Interrupt/Event manager; | modes for stuck at wrong value (self test); ALU for stuck at wrong value (self test); Registers (GPIO configuration registers, internal RAM) for stuck at wrong value; Clock, Software Program Sequence Execution: [Watchdog test with a different time base and time window along with logical monitoring of program sequence]; Interrupt/Event Manager health for Stuck at failure mode (including illegal interrupts); | core CPU to detect both stuck-at and sequential errors in addressing modes; ALU (including used math library and instruction set); Independent test for ALU errors; Registers (GPIO, Configuration Registers, internal RAM); test for corruption/errors; Software Program Sequence and Execution: Temporal and logical monitoring of program sequence; Clock/Timers- independent tests; Interrupts/Event Manager Health (including illegal interrupts); |
| Analog to Digital Converter, Digital I/O | Stuck Open; Stuck Close; | Stuck Open; Stuck Close; Drift or offset | Stuck Open; Stuck Close; Drift or oscillation or offset; |
| Power Supply | Under/over voltage; | Under/over voltage; Drift; | Under/over voltage; Drift; Power spikes; |
| Memory (RAM, ROM/FLASH, EEPROM) | Stuck memory; Stack overflow, underflow; | Memory corruption; Stack overflow, underflow; Illegal memory access; | Memory corruption; Stack health for overflow, underflow; Illegal memory access; Corrupted memory address (Memory Addressing); |
| Serial Communication | Corrupted data (incorrect data); Loss of data; Interrupted data (partial data transmit or no data transmit); Message repetition; | Aged data (delay, repeated data,); Corrupted data (incorrect data, insertion of data, re-sequencing); Loss of data; Interrupted data (partial data transmit or no data transmit); Message repetition; | Aged data (delay, repeated data, resequencing); Corrupted data (incorrect data, insertion of data, re-sequencing); Loss of data; Interrupted data (partial data transmit or no data transmit); Masquerading (legitimacy of the functional source, illegal additions of data to an authentic message, replaying an authentic message); |

The quantitative analysis involves determining whether a probability of a random occurrence of the hazard 304 is less than a predetermined probability. The standards module 240 may obtain the predetermined probability based on the classification of the hazard 304. The standards module 240 may obtain the predetermined probability from a table of predetermined probabilities indexed by classification. An example table of the predetermined probabilities for different classifications of hazards is provided below.

| Classification of Hazard | Predetermined Probability (Occurrence Rate/Operational Hour) |
|---|---|
| ASIL D | <$10^{-8}$ |
| ASIL C | <$10^{-7}$ |
| ASIL B | <$10^{-7}$ |
| ASIL A | <$10^{-6}$ |

A probability calculation module 248 may calculate the probability of a random occurrence of the hazard 304 based on the failure rate of each basic element block of the fault tree and the logic gates used in the fault tree. The probability calculation module 248 may calculate the probability for the hazard 304 using one or more predetermined probability models, such as a constant failure rate model, a fixed failure rate model, and/or one or more other suitable models.

The constant failure rate model may be used to represent failures that are apparent immediately. For example only, the probability that an electrical component will fail under the constant failure rate model may be expressed as:

$$Q(t) = \frac{\lambda}{(\lambda + \mu)} * (1 - e^{-(\lambda+\mu)*T}),$$

where $\mu$ is a component repair rate, $\lambda$ is a failure rate of the component, T is the usable lifetime of the component, and Q(t) is a failure rate at a given time. For purposes of the FTA, the probability calculation module 248 may set $\mu$ equal to zero and set T equal to a predetermined value, such as approximately 12,000 hours.

The fixed failure rate model may be used to represent the failure rate (Q) of an element that does not vary with time. For example only, the fixed failure rate model may be used for the failure rate of software safety mechanisms and safety mechanism monitoring modules regarding their ability to detect and/or mitigate single point faults and/or dual point faults/latent faults. For example only, the probability calculation module 248 may set the failure rate for each software safety mechanism and safety mechanism monitoring module (that meets the coverage analysis requirements) to 0.01 or another suitable value.

The probability calculation module 248 may determine a failure rate for each minimal cut-set and determine the failure rate for the hazard 304 based on the failure rates of the minimal cut-sets and the logic gates used. The probability calculation module 248 may determine the failure rate for a minimal cut-set using the expression:

$$Q_{CUT} \cap_{i=1}^{n} Q_i,$$

where $Q_{Cut}$ is the failure rate of the minimal cut-set, $Q_i$ is the failure rate of the i-th element of the minimal cut-set, and n is the number of elements in the minimal cut-set. The probability calculation module 248 may determine the probability of the hazard 304 using cross-product approximation and the expression:

$$Q_{HAZ} = \sum_{i=1}^{n} Q_{CUTi} - \sum_{i=1}^{n-1} \sum_{j=i+1}^{n} Q_{ij}(t) + \ldots (-1)^{n+1} Q_{123\ldots n}(t),$$

where $Q_{HAZ}$ is the failure rate of the hazard 304, $Q_{CUTi}$ is the failure rate of the i-th minimal cut-set, n is the number of minimal cut-sets, and $Q_{ij}(t)$ is the product of the failure rate of the basic events in cut-sets i and j.

The probability calculation module 248 may determine the probability for the hazard 304 (e.g., occurrence rate per operational hour) based on the $Q_{HAZ}$ and T. More specifically, the probability calculation module 248 may set the probability for the hazard 304 equal to $Q_{HAZ}$ divided by T.

A quantitative analysis module 252 may compare the probability for the hazard 304 with the predetermined probability determined based on the classification of the hazard 304. The quantitative analysis module 252 may indicate whether the SCEC system is in compliance with the ISO 26262 standard for the hazard 304 based on the comparison. More specifically, the quantitative analysis module 252 may indicate that the SCEC system is in compliance with the ISO 26262 standard when the probability for the hazard 304 is less than the predetermined probability. Conversely, the quantitative analysis module 252 may indicate that the SCEC system is not in compliance with the ISO 26262 standard when the probability for the hazard 304 is greater than or equal to the predetermined probability.

The quantitative analysis module 252 may include the probability for the hazard 304 and the predetermined probability in the FTA report for the hazard 304. The quantitative analysis module 252 may also display the probability for the hazard 304 on the fault tree.

Figure 6:
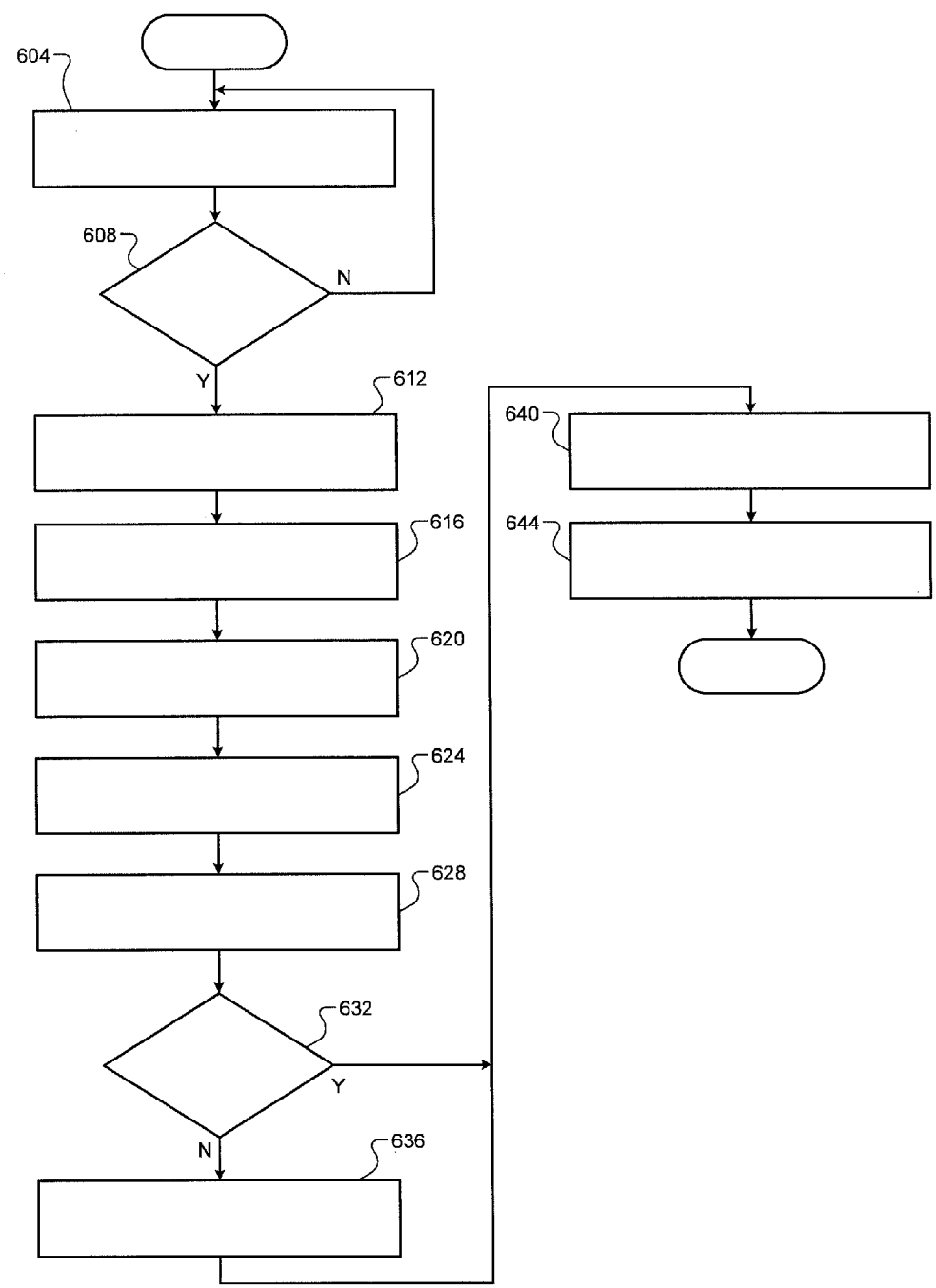
FIG. 6 is an example method of determining whether a system of a vehicle complies with an automotive hardware integrity standard for a hazard according to the present disclosure.

Referring now to FIG. 6, a flowchart depicting an example method of determining whether an SCEC system complies with the ISO 26262 standard for a hazard is presented. Control may begin with 602 where control receives fault tree data for generating a fault tree for the SCEC system and the hazard. The fault tree data may include, for example, elements of the SCEC system, failure rates of the elements, types of the elements, the classification of the hazard, failure types, etc.

At 608, control may determine whether a request to execute the FTA application has been input. If true, control may continue with 612; if false, control may return to 604. At 612, control may create an FTA report (at this point still blank) for the hazard.

Control may receive the minimum requirements for compliance with the ISO 26262 standard and update the FTA report to include the minimum requirements at 616. For example only, control may determine the minimum requirements based on the classification of the hazard under the ISO 26262 standard. The minimum requirements may include the minimum order for minimal cut-sets, the coverage analysis requirements, and the predetermined probability.

At 620, control may determine the minimal cut-sets and update the FTA report to include a list of the minimal cut-sets. Control may perform the cut-set analysis and update the FTA report based on the cut-set analysis at 624. For example only, control may compare the orders of the minimal cut-sets with the minimum order and indicate whether the orders of the minimal cut-sets are greater than or equal to the minimum order.

Control may perform the diagnostic coverage analysis and update the FTA report based on the diagnostic coverage analysis at 628. For example only, control may determine whether one or more safety mechanisms and/or safety mechanism monitoring modules provided for each single point fault or plausible dual point fault/latent fault satisfy the coverage analysis requirements for the hardware element and the classification of the hazard.

At 632, control may determine whether the failure rate data is acceptable. If false, control may selectively flag failure rate data as being unacceptable in the FTA report at 636 and continue with 640. If true, control may continue with 640. For example only, user input failure rate data that is different than failure rate data from one or more trusted sources may be deemed unacceptable in various implementations.

Control may determine the probability of a random occurrence of the hazard at 640. Control may analyze the probability for the hazard and update the FTA report and/or the fault tree based on the result of the analysis at 644. For example only, control may add the probability for the hazard to the fault tree at 640. Control may also add the probability to the FTA report. Control may also compare the probability for the hazard with the predetermined probability and indicate whether the probability is less than the predetermined probability. Control may include the indication, for example, in the FTA report.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
   receiving classification data for a hazard associated with a system of a vehicle, the classification data indicating a classification of the hazard under standard 26262 of the International Organization for Standardization (ISO);
   receiving fault tree data for a fault tree of the hazard;
   analyzing the fault tree data using a fault tree analysis (FTA) application;
   identifying a minimal cut-set for the hazard;
   retrieving standards data for the hazard based on the classification of the hazard, the standards data indicating a minimum value for minimal cut-sets under the 26262 standard;

comparing a number of elements in the minimal cut-set with the minimum value; and indicating whether the minimal cut-set complies with the 26262 standard based on the comparison.

2. The method of claim 1 further comprising indicating that the minimal cut-set does not comply with the 26262 standard when the number is less than the minimum value.

3. The method of claim 1 further comprising indicating that the minimal cut-set complies with the 26262 standard when the number is greater than or equal to the minimum value.

4. The method of claim 1 further comprising indicating whether the system complies with the 26262 standard based on the comparison.

5. The method of claim 1 further comprising indicating that the system does not comply with the 26262 standard when the number is less than the minimum value.

6. The method of claim 1 further comprising:

receiving a failure rate for each element of the minimal cut-set, wherein the minimal cut-set includes at least two elements;

determining a second failure rate for the minimal cut-set based on the failure rates for the at least two elements; and determining an occurrence rate for the hazard as a function of the second failure rate.

7. The method of claim 6 further comprising determining a probability of occurrence for the hazard based on the occurrence rate.

8. The method of claim 7 further comprising indicating the probability of occurrence of the hazard.

9. The method of claim 7 further comprising:

comparing the probability of occurrence of the hazard with a predetermined probability, wherein the standards data further includes the predetermined probability; and indicating whether the system complies with the 26262 standard based on the comparison of the probability of occurrence with the predetermined probability.

10. The method of claim 9 further comprising indicating that the system does not comply with the 26262 standard when the probability of occurrence of the hazard is greater than the predetermined probability.

11. The method of claim 6 wherein the receiving the failure rate for each element of the minimal cut-set includes retrieving the failure rates from a tangible, computer readable storage medium.

12. The method of claim 11 further comprising retrieving the failure rates based on types of the elements, respectively.

13. The method of claim 6 wherein the receiving the failure rate for each element of the minimal cut-set includes receiving the failure rates from a user.

14. The method of claim 13 further comprising selectively indicating that at least one of the failure rates was input by the user.

15. The method of claim 1 wherein the analyzing the fault tree data using the FTA application includes analyzing the fault tree data using FaultTree+ by Isograph.

* * * * *